July 7, 1964     R. R. PETERSON     3,140,081
TUBE FORM MOUNTING
Filed March 18, 1963

INVENTOR.
Robert R. Peterson
BY Ralph Hammar
Attorney 3,140,081
TUBE FORM MOUNTING
Robert R. Peterson, Erie, Pa., assignor to Lord Manufacturing Company, Erie, Pa., a corporation of Pennsylvania
Filed Mar. 18, 1963, Ser. No. 265,786
2 Claims. (Cl. 267—1)

This invention simplifies the manufacture and improves the fatigue life of tube form mountings by a modification of the end contour of the elastomer.

Figure 1:
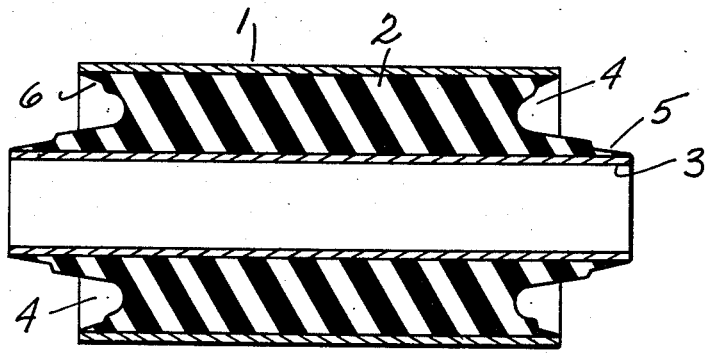
Figure 2:
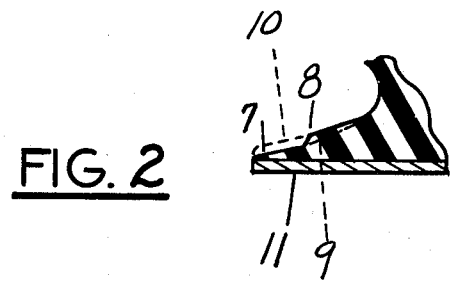

In the drawing, FIG. 1 is a longitudinal section through a tube form mounting and FIG. 2 is an enlarged fragmentary view of the end contour of the elastomer.

The tube form mounting comprises an annulus 2 of elastomer bonded at its outer surface to an outer metal shell 1 and at its inner surface to a metal center member 3. The ends of the elastomer are recessed at 4 so there is an extension 5 along the outer surface of the inner member 3 and an extension 6 along the inner surface of the outer member 2. The extensions 5 and 6 are intended to prevent stress concentration at the outer edges of the bond between the elastomer and the members 2 and 3. See for example Patent 1,937,581 describing the effect of an extension in preventing localized strain. Failure of the bond starts at the outermost edge and works progressively inward and once the failure has started, the strength is decreased. It is, therefore, important that the integrity of the bond be preserved at the outermost edge.

In accordance with the present invention, each of the extensions of the elastomer is provided with a tapered section 7 decreasing in thickness and merging axially toward the surface to which the elastomer is bonded and with a bead 8 outstanding from the inner or thicker end of the tapered section 7. Referring to FIG. 2, the contour indicated at 7 and 8 will maintain its strength under flexing load for a substantially longer time than the mounting having the contour indicated by dotted line 9 or by dotted line 10. For example, a mounting with the end contour 7, 8 after a test at full load for 300,000 cycles had 97% of its life remaining while the identical mounting with the end contour 10 or 9 had approximately 82% of its life remaining. This improvement is thought to be due to the fact that the bead 8 acts as a barrier to the transmission of stress to the tapered section 7. The stress is effectively stopped at point 11. With the contour 9, the stress in the elastomer can travel along and may produce high stress within the tapered section 7. With the contour 10, the stress can be transmitted to the outer end of the bond between the elastomer and the metal part and thereby over strain the bond and start tearing, resulting in progressive failure.

In addition to improved life, the contour 7, 8 is easier to manufacture. The tapered section 7 seems to wedge the elastomer tight against the adjacent metal parts 1, 3 providing a tight bond free from cracks or weak spots.

Also, the critical point in the bond indicated by the numeral 11 is recessed inward from the ends of the metal parts. One advantage is better preparation of the metal parts for bonding whether by adhesive or by plating processes. It is difficult to maintain the required treatment at the outermost edges of the metal parts. This difficulty is not present in the region of numeral 11. Another advantage is that the integrity of the outer ends of the metal parts is no longer critical. When the elastomer extends to the outer end of the metal parts as indicated by dotted line 10, any cut or nick in the outer end of the metal may become the site of a bond failure. It accordingly is not possible to sand or machine the outer end of the metal without risking injury to the bond. Even a dent or nick in the outer end of the metal such as might occur during installation could result in bond failure with the contour 10. Such bond failure does not occur with the contour 7, 8 because the bond to the tapered section 7 is essentially stress free.

The thickness of the tapered section 7 is negligible. The taper is only enough for draft. The section 7 may be only a skin of elastomer. The section is not stressed and does not enter into the performance of the mounting. However, the section 7, particularly at the outer shell 1, is an important improvement.

What is claimed as new is:

1. A tube form mounting comprising an annulus of elastomer, an outer metal shell surrounding and bonded to the outer surface of the annulus, an inner metal member extending through and bonded to the center surface of the annulus, said annulus having a first integral axial extension thin compared to the thickness of the annulus and extending along the inner surface of the outer shell with its termination recessed axially inward of the outer end of the metal shell, and said annulus having a second integral axial extension thin compared to the thickness of the first extension and extending along the inner surface of the outer shell from the termination of the first extension toward the outer end of the metal shell, a step between the termination of the first extension and the beginning of the second extension serving as a barrier to the transmission of stress from the first extension to the second extension so that the second extension is essentially stress free whereby it cannot become the site of bond failure.

2. A tube form mounting comprising an annulus of elastomer, an outer metal shell surrounding and bonded to the outer surface of the annulus, an inner metal member extending through and bonded to the center surface of the annulus, said annulus having a first integral axial extension thin compared to the thickness of the annulus and extending along the inner surface of the outer shell with its termination recessed axially inward of the outer end of the metal shell, and said annulus having a second integral axial extension of negligible thickness extending along the inner surface of the outer shell from the termination of the first extension toward the outer end of the metal shell, a bead outstanding from the inner or thicker end of the second extension acting as a barrier to the transmission of stress from the first extension to the second extension so that the second extension is essentially stress free whereby it cannot become the site of bond failure.

References Cited in the file of this patent
UNITED STATES PATENTS

| | | |
|---|---|---|
| 2,327,113 | Krotz | Aug. 17, 1943 |
| 2,636,360 | Guy | Apr. 28, 1953 |
| 3,033,011 | Garrett | May 8, 1962 |

FOREIGN PATENTS

| | | |
|---|---|---|
| 794,135 | France | Dec. 2, 1935 |
| 1,231,562 | France | Apr. 11, 1960 |